Figure 1:
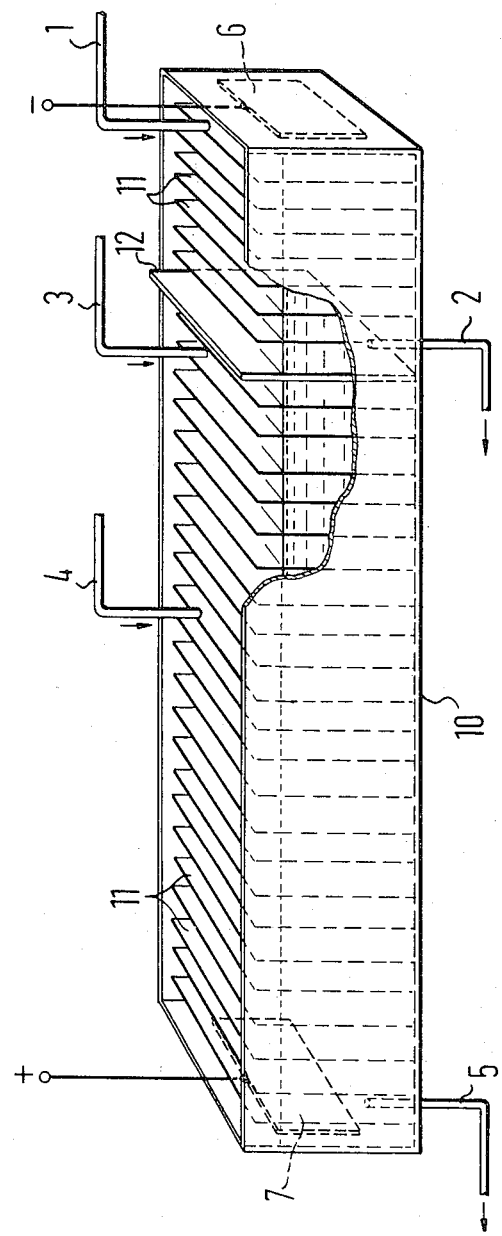

United States Patent [19]
Bilal et al.

[11] 3,821,091
[45] June 28, 1974

[54] METHOD OF SEPARATING PLUTONIUM FROM URANIUM AND FROM OTHER TRANSURANIUM ELEMENTS

[75] Inventors: Abdel-Latif Bilal; Klaus Metscher; Karl-Erik Zimen, all of Berlin, Germany

[73] Assignee: Hahn-Meitner-Institut fur Kernforschung Berlin GmbH, Berlin, Germany

[22] Filed: July 25, 1972

[21] Appl. No.: 274,900

[30] Foreign Application Priority Data
July 28, 1971 Germany.............................. 2137769

[52] U.S. Cl................. 204/1.5, 204/180 P, 423/3, 423/251
[51] Int. Cl............................................ C01g 56/00
[58] Field of Search ............. 204/1.5, 180 R, 180 P; 423/3, 20, 251; 252/301.1 R

[56] References Cited
UNITED STATES PATENTS

| | | |
|---|---|---|
| 2,739,934 | 3/1956 | Kunin ................................ 204/1.5 |
| 2,890,098 | 6/1959 | Olson................................ 423/10 X |
| 3,042,597 | 7/1962 | Schumacher.................... 204/180 R |
| 3,213,002 | 10/1965 | Benedict............................. 204/1.5 |
| 3,259,473 | 7/1966 | Hopkins et al...................... 423/251 |
| 3,305,471 | 2/1967 | Von Munchhausen et al. 204/180 R |
| 3,382,164 | 5/1968 | Webb et al....................... 204/180 P |
| 3,705,845 | 12/1972 | Evaraerts........................ 204/180 R |

Primary Examiner—Carl D. Quarforth
Assistant Examiner—R. L. Tate
Attorney, Agent, or Firm—Hans Berman; Kurt Kelman

[57] ABSTRACT

Plutonium is separated from uranium and other transuranium elements by subjecting an aqueous solution in dilute nitric acid of the elements to be separated to electrolytic extraction by counter-current or cross-current ion migration in the presence of a complexing agent, preferably acetic acid or a mixture of hydrofluoric acid with an alkali metal fluoride, until plutonium and the other elements present accumulate in separate portions of the solution which are thereafter separately withdrawn.

11 Claims, 4 Drawing Figures

METHOD OF SEPARATING PLUTONIUM FROM URANIUM AND FROM OTHER TRANSURANIUM ELEMENTS

This invention relates to a method of separating plutonium from uranium and/or other transuranium elements.

Plutonium is present in spent atomic reactor fuel, and its recovery from such fuel is important for economical reactor operation. For such recovery the plutonium is to be separated from accompanying uranium and other transuranium elements. Numerous separating methods have been proposed, and some are in present actual use although they are not entirely satisfactory.

It is known to precipitate plutonium in the quadrivalent state from its common, strongly acidic solutions with uranium by means of bismuth phosphate. The precipitation is a batch method and difficult to perform by remote control, as is necessary.

It has also been proposed to separate uranium from trivalent plutonium by extraction with organic solvents. The necessary reduction of stable tetravalent plutonium to the trivalent state requires the addition of substantial amounts of reagents alien to the process. Moreover, the extracting agents are decomposed by radiation so that valuable material is lost, and the degree of separation is impaired. It is also difficult to stabilize the trivalent plutonium and the reducing agent in the presence of the nitric acid necessarily employed in initially dissolving the spent fuel elements.

For a sufficiently fast reduction, ferrous sulfamate or a mixture of uranium (IV) nitrate and hydrazine nitrate is used as a reducing agent which also acts as a stabilizer. The reducing agents are insoluble in the organic medium and must be employed in an excess of 2 to 15 times the plutonium equivalent, thereby burdening the reaction system with large amounts of alien material. At plutonium contents of 10% to 20%, as envisaged in fuel elements from fast breeder reactors, the amount of reducing agent required is of the same order of magnitude as the product to be processed. The plant employed would be of correspondingly large dimensions and would have to include an arrangement for separating plutonium from iron and for storing iron contaminated with plutonium if ferrous sulfamate is the reducing agent. The use of uranium nitrate would enlarge the amount of material to be separated in an obvious manner.

It has further been proposed to separate uranium and plutonium from each other by sublimation of their hexafluorides. The fluorine present is a powerfull corrosive agent, particularly at the elevated pressures necessary for the process. Moreover, it is difficult to separate plutonium completely from the uranium by this method because a dissociation equilibrium is established between plutonium hexafluoride, plutonium tetrafluoride, and fluorine.

Additional processes relying on media other than water have been suggested but have been found to combine unsatisfactory separating effects with serious engineering problems.

The primary object of the instant invention is the provision of a method which permits plutonium to be separated from uranium and accompanying other transuranium elements, and is free from the shortcomings of the afore-described known processes. More particularly, the invention aims at a separation process which is readily adapted to continuous operation on an industrial scale and capable of convenient remote control.

It has now been found that plutonium is readily separated from contaminants such as uranium and other transuranium elements by subjecting a body of a solution of plutonium and of the contaminant or contaminants in dilute, aqueous nitric acid to electrolytic extraction by counter-current or cross-current ion migration in the presence of a complexing agent until the plutonium and the contaminant or contaminants accumulate in separate portions of the body from which they may be withdrawn with the solution.

The solution should not be more than one-normal with respect to nitric acid, the plutonium should be quadrivalent or hexavalent, uranium hexavalent, neptunium pentavalent, and any other transuranium element present should be trivalent.

Counter-current electrolysis is a known process (see "Chemie-Ingenieur-Technik" 42 [1970] 1090–1094). Basically, the method resides in causing a carrier solvent to flow counter-current to ions migrating in an electric field at different velocities, the velocity of the solvent being selected to compensate for the average rate of migration of the ions in the electric field in such a manner that the common center of gravity of the ions remains stationary, but individual species of ions migrate with the solvent, or against its direction of flow according to their mobility, and may thus be recovered separately. In counter-current ion migration systems, the direction of liquid flow is opposite to the normal direction of migration of at least a portion of the ions in the electric field, whereas the carrier liquid flows transverse to the electric field in a cross-current ion migration system.

In the method of the instant invention, a complex is formed by a suitable complexing agent with at least one component of the mixture to be separated, the one component traveling in a direction opposite to the direction of migration of the other components during the separation process. The complex is caused to move either by the flowing carrier liquid alone or by the liquid flow and the electric field acting jointly, that is, it is subjected to continuous electrolytic extraction.

Suitable complex forming agents for the aforementioned elements include water-soluble carboxylic acids, fluoride ions, chelating agents, nitrates, sulfates, and phosphates. Best results so far have been achieved by the use of acetic acid and of a mixture of alkali metal fluoride and hydrofluoric acid, and these two complexing agents are preferred.

The aqueous solution of the elements to be separated should be not more than one-normal with respect to nitric acid. It is preferred to perform the method in solutions which are 0.02-normal to 0.6-normal with respect to the nitric acid, and best results are achieved in solutions which are approximately 0.1-N, that is, between 0.05-N and 0.2-N with respect to nitric acid.

The starting material normally consists of spent, solid, fuel elements withdrawn from a reactor and is dissolved in an excess of strong or concentrated nitric acid. In order to make the solution suitable for the electrolyis step of this invention, the several elements must be converted to the valence states mentioned above. This is preferably achieved by adding the complexing agent to the solution containing excess nitric acid, and by lowering the nitric acid concentration by the addition of a reducing agent which preferably forms gaseous oxidation products only. Suitable reducing agents include formic acid and formaldehyde.

Figure 2:
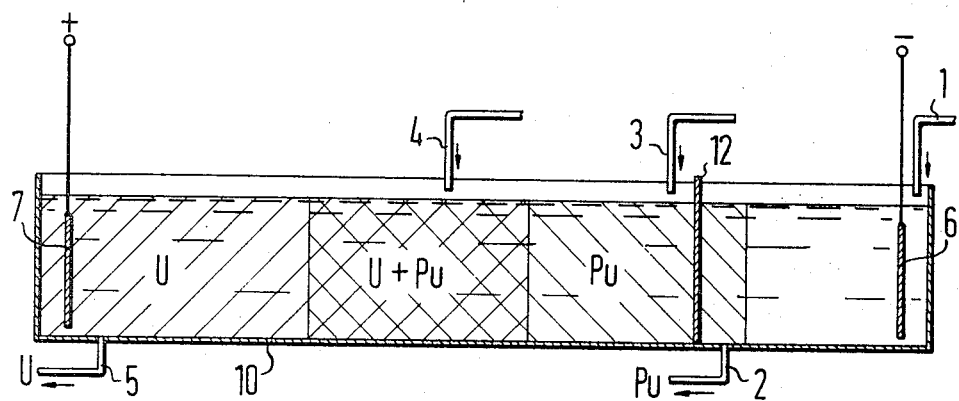
Figure 3:
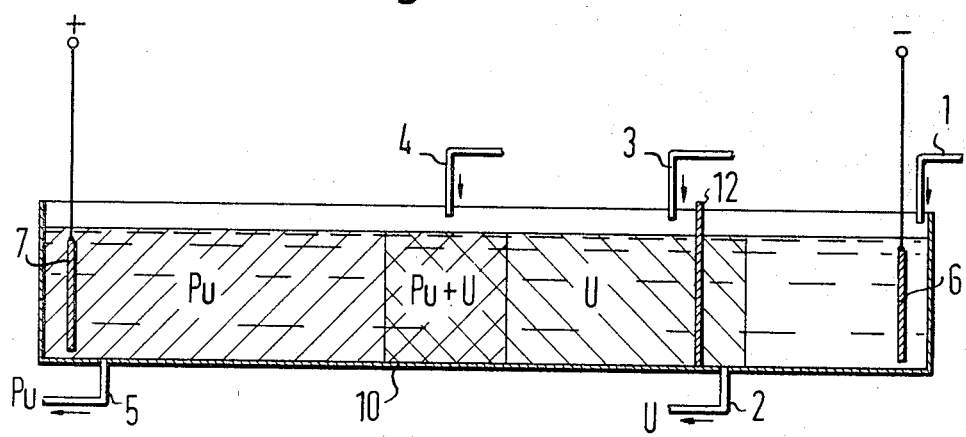
Figure 4:
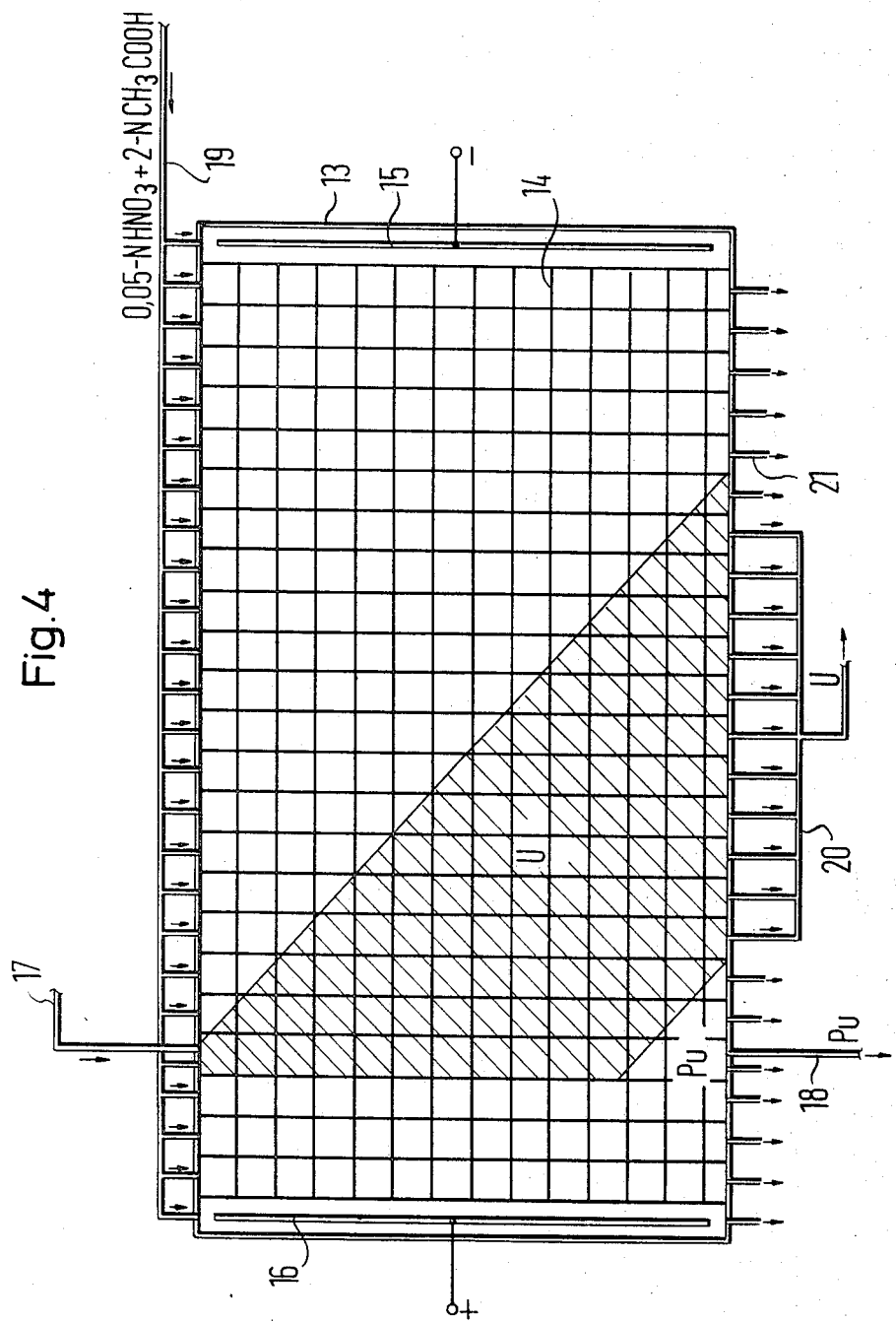

Apparatus for performing the method of the invention is illustrated in the appended drawing in which:

FIG. 1 shows a separating column for use with counter-current ion migration in a perspective view, a portion of the enclosure being broken away better to reveal internal features;

FIGS. 2 and 3 respectively show the apparatus of FIG. 1 in elevational section as used with two different complexing agents; and FIG. 4 illustrates apparatus for electrolytic extraction by cross-current ion migration in top plan view.

Referring initially to FIG. 1, there is seen a horizontally elongated, rectangular trough 10 which is divided by a large number of partitions 11 into longitudinally consecutive compartments which communicate with each other through openings in or around the partitions. A semi-permeable membrane 12 separates a section amounting to approximately one quarter of the trough length from the remainder and permits the passage of ions in the electric field while preventing liquid flow.

The last compartment in the shorter trough section encloses the cathode 6, and the anode 7 is arranged in the compartment farthest from the short trough section. A feed pipe 1 leads into the cathode compartment, and a discharge pipe 2 leads downward from the compartment in the shorter section which is contiguously adjacent the membrane 12. Other feed pipes 3, 4 respectively lead into the compartment of the longer trough section immediately adjacent the membrane 12 and into a compartment approximately equidistant from the membrane 12 and the anode 7. The larger trough section is drained by a discharge pipe 5 directly communicating with the anode compartment. Control valves (not shown) in the pipes 1, 2, 3, 4, 5 permit the rate of liquid flow to and from the trough 10 to be controlled precisely.

In operating the apparatus shown in FIG. 1, a suitable carrier liquid, such as an aqueous mixture of acetic and nitric acid, is fed to the cathode compartment through the pipe 1. An aqueous solution of acetic acid containing some nitric acid is fed to the trough 10 through the pipe 3 as a complexing agent. The solution of plutonium and contaminants is introduced into the trough through the pipe 4, and portions of the liquid body in the trough 10 are continuously withdrawn through the pipes 2 and 5. The rate of liquid flow from the pipe 1 is selected in such a manner that the reaction of the liquid near the cathode does not become alkaline and that cations cannot reach the cathode 6.

The flow rates at the pipes 1, 3, and 4 then are adjusted so as to produce a stationary or stable state in which the two components to be separated, that is, plutonium and the contaminants, are withdrawn separately through the pipes 2, 5 respectively.

FIG. 2 illustrates the distribution of uranium and plutonium in the trough 10 during operation of the system if a carrier electrolyte of 0.1-N nitric acid, 0.1-N hydrofluoric acid, and 0.2-N sodium fluoride (or any other alkali metal fluoride) is employed. Plutonium, both quadrivalent and hexavalent, is present exclusively as cationic species whereas the hexavalent uranium is present exclusively as an anionic species. When a stationary state is reached by proper adjustment of the non-illustrated, flow-controlling valves in the pipes 1, 3, and 4, only pure plutonium, uncontaminated by uranium, is withdrawn with the liquid flowing through the discharge pipe 2, and only pure uranium is withdrawn at 5.

Conditions prevailing with the use of acetic acid as the complexing agent are illustrated in FIG. 3. The aqueous carrier electrolyte employed consisted of 2-N acetic acid and 0.05-N nitric acid. Hexavelent uranium was present exclusively as a cationic species whereas quadrivalent plutonium was present as a neutral species. Suitable adjustment of the valves in the pipes 1, 3, 4 permitted a stationary state to be reached in which all uranium could be withdrawn through pipe 2, and all plutonium through pipe 5.

Americium, curium, neptunium were similarly separated from the plutonium together with the uranium when the neptunium was present in the pentavalent state and the other transuranium elements were present in the trivalent state. The decontamination factor for the separation of uranium and plutonium in the method of the invention is greater than $10^8$.

It is a particular advantage of the fluoride complexing system illustrated in FIG. 2 that the prevalent uranium is caused to migrate in the same direction by the flowing liquid and by the electric current. In the acetate complexing system, the uranium migrates against the liquid current. The method of the invention is thus particularly well suited for supplementing or modifying the known Purex process in which spent fuel elements of atomic reactors are worked up by extraction with tri-n-butyl phosphate, one of the fractions formed containing the plutonium and uranium.

Very good results have been achieved in the fluoride system if the electrolyte was 0.02-normal to 0.5-normal with respect to the hydrofluoric acid and 0.04 to 1-normal with respect to the alkali metal fluoride, sodium or potassium fluoride being most economical. For best results, a narrower range of 0.05-N to 0.2-N hydrofluoric acid and 0.1-N to 0.3-N alkali metal fluoride is preferred, that is, the fluorine concentration contributed by the alkali metal fluoride should be about twice that provided by the hydrofluoric acid.

In the acetate complexing system, good results were obtained in solutions 0.5-normal to 4-normal with respect to acetic acid, the preferred range being between 1.5-normal and 2.5-normal.

FIG. 4 shows a tank 13 in which plutonium is separated from accompanying uranium by cross-current ion migration. The elongated tank 13 is rectangular, shallow, and upwardly open. It is provided with a grid of cooling elements 14 which separates most of the tank into small, square compartments communicating with each other through restricted passages between the cooling elements and the tank walls. The cooling elements are connected with a non-illustrated, conventional refrigeration system which circulates chilled brine through the elements 14.

Two large compartments respectively extending over the full width of the tank 13 along its shorter upright walls respectively receive a cathode 15 and an anode 16. A feed pipe 17 enters the tank 13 through a first one of its longitudinal walls spacedly adjacent the anode 16, and a discharge pipe 18 leads outward of the tank 13 through the second longitudinal tank wall opposite the pipe 17.

A feed manifold 19 is connected with each row of compartments through the first longitudinal tank wall, and a discharge manifold 20 communicates with almost one half of the rows of compartments, remote from the electrodes 15, 16, through openings in the second longitudinal tank wall. The rows of compartments adjacent the electrodes 15, 16 are provided with drains 21 for maintaining a flow of carrier liquid through the tank 13 at right angles to the direction of elongation and of the electric field between the electrodes 15, 16. All conduits leading into and out of the tank 13 are equipped with control valves, not shown.

During operation of the apparatus illustrated in FIG. 4, the solution to be fractionated is fed to the tank 13 through the pipe 17 whereas an aqueous carrier solution, 2-normal with respect to acetic acid and 0.05-normal with respect to nitric acid is fed through the manifold 19 to each row of compartments at the same rate. Plutonium is not affected by the electric field and migrates with the electrolyte across the tank to the pipe 18 from which it is withdrawn. Uranium and the other transuranium elements are deflected toward the cathode by the applied potential, and thus accumulate along the second longitudinal tank wall, as indicated by hatching. The liquid withdrawn through the manifold 20 is free from plutonium.

The method of the invention does not rely on oxidation or reduction of the plutonium, and thus avoids the difficulties resulting from the reduction process in one of the afore-described known methods. The method of the invention is carried out entirely in an aqueous medium not affected by ionizing radiation. No alien materials that could interfere with the purification of the plutonium or its ultimate use are introduced. The method is well suited to continuous operation under conditions set by remote control and automatically maintained in a manner not explicitly described, but obvious. The apparatus employed is relatively inexpensive. Further purification of the plutonium is unnecessary because of the extremely high decontamination factor achieved.

The energy requirements of the cross-current ion migration system illustrated in FIG. 4 are only one third of the energy requirements of the counter-current system, or the throughput of the counter-current system per unit of supplied energy is three times that of the cross-current unit.

The following Example further illustrates the invention.

The apparatus illustrated in FIG. 1 was fed through the pipe 1 with an aqueous carrier liquid 2-normal with respect to acetic acid, and 0.05-normal with respect to nitric acid at a rate of 50 ml per hour. The amount of liquid drained from the cathode section through the pipe 2 also was set for 50 ml per hour. The same carrier solution was fed to the larger tank section through the pipe 3 at a rate of 10 ml per hour. The feed pipe 4 supplied a solution 0.3-N with respect to uranyl nitrate, 0.01-normal with respect to plutonium (IV) nitrate, 2-normal with respect to acetic acid, and 0.05-normal with respect to nitric acid at a rate of 30 ml per hour. The liquid withdrawal through the discharge pipe 5 was set at slightly less than 40 ml per hour to compensate for water loss by evaporation from the exposed liquid surface.

The trough 10 had a length of 40 cm and a cross section of 5 cm$^2$. The total liquid volume was 350 ml. The liquid was cooled by cooling elements, not illustrated, but obvious from FIG. 4, at a rate of 1 watt per cm$^3$.

The potential applied to the electrodes 6, 7 was 700 volts, and the current was 500 milliampere after stationary conditions had been reached. Where uranyl ions accumulated, the local field strength was 5 V/cm. In the area of plutonium accumulation, it was 20 V/cm, and it was found to be 40 V/cm in the cathode section between the pipes 1 and 2 where it was kept free of heavy metal ions.

Uranium and plutonium were separated in continuous operation at a decontamination factor of more than $10^8$ in 100% yield.

Similar operation of a separating apparatus having a cross section of 100 cm$^2$ and a cooling capacity of 50 W/cm$^3$ permitted a throughput of about 1 mole per hour in either direction of ion migration.

What is claimed is:

1. A method of separating plutonium from at least one member of the group consisting of uranium, neptunium, and another transuranium element different from plutonium, which comprises:
    a. passing direct current through a body of a solution of said plutonium and of said at least one member in dilute aqueous nitric acid while causing said body to flow in the presence of a complexing agent until said plutonium and said at least one member accumulate in separate portions of said body; and
    b. separately withdrawing said solution from said separate portions,
        1. said plutonium being quadrivalent or hexavalent, said uranium being hexavalent, said neptunium being pentavalent, and said other element being trivalent,
        2. said solution being not more than one-normal with respect to said nitric acid, and
        3. said complexing agent being acetic acid or a mixture of alkali metal fluoride and hydrofluoric acid.

2. A method as set forth in claim 1, wherein said solution is caused to flow in the direction of said current.

3. A method as set forth in claim 1, wherein said solution is caused to flow transversely to said current.

4. A method as set forth in claim 1, wherein said solution is 0.02-normal to 0.6 normal with respect to said nitric acid.

5. A method as set forth in claim 4, wherein said solution is 0.05-normal to 0.2-normal with respect to said nitric acid.

6. A method as set forth in claim 4, wherein said complexing agent is acetic acid, and said solution is 0.5-normal to 4-normal with respect to said acetic acid.

7. A method as set forth in claim 4, wherein said complexing agent is acetic acid, and said solution is 1.5-normal to 2.5-normal with respect to said acetic acid.

8. A method as set forth in claim 4, wherein said complexing agent is a mixture of alkali metal fluoride and hydrofluoric acid, and said solution is 0.02-normal to 0.5-normal with respect to said hydrofluoric acid and 0.04-normal to 1-normal with respect to said alkali metal fluoride.

9. A method as set forth in claim 4, wherein said complexing agent is a mixture of alkali metal fluoride and hydrofluoric acid, and said solution is 0.05-normal to 0.2-normal with respect to said hydrofluoric acid, and 0.1-normal to 0.3-normal with respect to said alkali metal fluoride.

10. A method as set forth in claim 1, wherein said solution is prepared by dissolving a solid body containing said plutonium and said at least one member in an excess of nitric acid, and by removing said excess by reaction with a reducing agent, said reducing agent being converted to a gaseous oxidation product by reaction with said excess.

11. A method as set forth in claim 10, wherein said reducing agent is formic acid or formaldehyde.

* * * * *